(12) United States Patent
Kwon et al.

(10) Patent No.: US 8,094,577 B2
(45) Date of Patent: Jan. 10, 2012

(54) APPARATUS AND METHOD FOR TRANSCEIVING DATA USING RELAY DEVICE IN WIRELESS COMMUNICATION SYSTEM OF CENTRALIZED MAC

(75) Inventors: Hyoung Jin Kwon, Chungcheongbuk-do (KR); Yong Sun Kim, Suwon-si (KR); Kyeongpyo Kim, Daejeon (KR); Seung Eun Hong, Daejeon (KR); Woo Yong Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 104 days.

(21) Appl. No.: 12/496,354

(22) Filed: Jul. 1, 2009

(65) Prior Publication Data

US 2010/0008247 A1 Jan. 14, 2010

(30) Foreign Application Priority Data

Jul. 14, 2008 (KR) .................. 10-2008-0068345
Sep. 10, 2008 (KR) .................. 10-2008-0089080
Feb. 19, 2009 (KR) .................. 10-2009-0013777

(51) Int. Cl.
*G01R 31/08* (2006.01)
(52) U.S. Cl. ............ 370/252; 370/315; 370/338
(58) Field of Classification Search ............ 370/252, 370/338, 226, 203; 455/455
See application file for complete search history.

(56) References Cited

U.S. PATENT DOCUMENTS

| 6,205,341 | B1 * | 3/2001 | Monot et al. ............... 455/562.1 |
| 7,230,915 | B2 | 6/2007 | Kobayashi |
| 7,760,689 | B2 * | 7/2010 | Shin et al. .................... 370/332 |
| 2004/0043782 | A1 | 3/2004 | Gupta |
| 2008/0108369 | A1 * | 5/2008 | Visotsky et al. ............. 455/455 |

FOREIGN PATENT DOCUMENTS

| JP | 2008-148032 | 6/2008 |
| KR | 10-2006-0047735 | 5/2006 |
| KR | 10-0759312 | 9/2007 |

OTHER PUBLICATIONS

Korean Office Action issued Apr. 12, 2011 in coresponding Korean Patent Application No. 10-2009-0013777.

* cited by examiner

*Primary Examiner* — Ricky Ngo
*Assistant Examiner* — David Oveissi
(74) *Attorney, Agent, or Firm* — Staas & Halsey LLP (57) ABSTRACT

Provided is an apparatus and method for transmitting and a receiving data using a relay device in a centralized Media Access Control (MAC). The apparatus may include: a channel decision unit to determine a channel status with respect to a communication path using a corresponding device and a communication path using a relay device; a path selection unit to select at least one communication path between the communication path using the corresponding device and the communication path using the relay device, based on the channel status; and a transceiver to transmit and receive the data via the selected at least one communication path.

9 Claims, 11 Drawing Sheets

| bits : 7 | 2 | 4 | 2 | 4 | 3 | 1 |
|---|---|---|---|---|---|---|
| Reserved | Current MCS status | FER | Suggested CES length | SINR | RSSIr | Valid |

FIG. 4

| octets : 3 | 2 | 2 |
|---|---|---|
| Reserved | Length | Command type |

Link Quality Probe Request Command format

| octets : 3 | 2 | 2 |
|---|---|---|
| Link Quality Status | Length | Command type |

Link Quality Probe Response Command format

Case 1. Blk-ACK with
Aggregation - no error

▨ Relay CTA
▨ Aggregated Data Frame to Direct Link
▩ Blk-ACK Frame to Direct Link When Source received Blk-ACK well in reposed to Aggregated Data frame

CTAP

Case 2. Blk-ACK with
Aggregation - error

▨ Relay CTA
▨ Aggregated Data Frame to Relay Link
▩ Blk-ACK Frame to Direct Link
▧ Aggregated Data Frame to Relay Link
▨ Blk-ACK Frame to Relay Link When Source didn't receive Blk-ACK well in reposed to Aggregated Data frame

CTAP

Case 3. Blk-ACK with Aggregation-source decides whether it will change path according to channel status

CTAP

After data sensing time, source will transmit aggregate data to diffrernt path intentionally

FIG. 10

Case 1. Imm-ACK : no error

Case 2. Imm-ACK : source does
not receive ACK frame due to data
error or ACK error Case 3. Imm-ACK : Source decides whether
it will change path according to channel status After data sensing time, source will transmit
aggregate data to different path intentionally

APPARATUS AND METHOD FOR TRANSCEIVING DATA USING RELAY DEVICE IN WIRELESS COMMUNICATION SYSTEM OF CENTRALIZED MAC

CROSS-REFERENCE TO RELATED APPLICATIONS

This application claims the benefit of Korean Patent Application No. 10-2008-0068345, filed on Jul. 14, 2008, Korean Patent Application No. 10-2008-0089080, filed on Sep. 10, 2008, and Korean Patent Application No. 10-2009-0013777, filed on Feb. 19, 2009, in the Korean Intellectual Property Office, the disclosures of which are incorporated herein by reference.

BACKGROUND

1. Field of the Invention

Embodiments of the present invention relate to an apparatus and method for transmitting and receiving data using a relay device in a centralized Media Access Control (MAC) based wireless communication system, and more particularly, an apparatus and method for transmitting and receiving data that may smoothly perform a data communication using a relay device, even when a direct path in a Line of Sight (LOS) between devices is blocked, or when a channel status is poor in a centralized MAC based wireless communication system.

2. Description of the Related Art

In a centralized Media Access Control (MAC) based wireless communication system, a channel of a using path may be blocked by a human being, an obstacle, and the like. Also, a status of the channel may be deteriorated.

In this case, the human being or the obstacle may move without remaining in a stop status for ever and thus a communication error status may be immediately solved. However, in the case of a wireless communication system in the band of 60 GHz, data may be exchanged at a high speed of 3 Gbps. Therefore, although the communication error status continues for a very short time, it may cause a serious problem.

Accordingly, in the centralized MAC based wireless communication system, there is a need for an apparatus and method for transmitting and receiving data that may smoothly perform a data communication, even when a using channel is blocked, or when a status of the channel is deteriorated due to the existence of a human being or an obstacle.

SUMMARY

An aspect of the present invention provides an apparatus and method for transmitting and receiving data using a relay device in a centralized Media Access Control (MAC) based wireless communication system that may smoothly transmit and receive data via a relay path using a relay device.

According to an aspect of the present invention, there is provided a device based on a centralized MAC, the device including: a channel decision unit to determine a channel status with respect to a communication path using a corresponding device and a communication path using a relay device; a path selection unit to select at least one communication path between the communication path using the corresponding device and the communication path using the relay device, based on the channel status; and a transceiver to transmit and receive the data via the selected at least one communication path.

According to another aspect of the present invention, there is provided a relay device based on a centralized MAC, the relay device including: a transceiver to receive data from a device via an antenna corresponding to a radio frequency (RF) chain of a reception mode to transfer, via an antenna corresponding to an RF chain of a transmission mode, the data to a corresponding device that desires to communicate with the device; and a mode switching unit to partially decode the data to switch a mode of at least one of the RF chain of the reception mode and the RF chain of the transmission mode based on the partially decoded data.

According to still another aspect of the present invention, there is provided a method of transmitting and receiving data at a device based on a centralized MAC, the method including: determining a channel status with respect to a communication path using a corresponding device and a communication path using a relay device; selecting at least one communication path between the communication path using the corresponding device and the communication path using the relay device, based on the channel status; and transmitting and receiving the data via the selected at least one communication path.

According to yet another aspect of the present invention, there is provided a method of transmitting and receiving data at a relay device based on a centralized MAC, the method including: receiving data from a device via an antenna corresponding to an RF chain of a reception mode to transfer, via an antenna corresponding to an RF chain of a transmission mode, the data to a corresponding device that desires to communicate with the device; and partially decoding the data to switch a mode of at least one of the RF chain of the reception mode and the RF chain of the transmission mode based on the partially decoded data.

EFFECT

According to embodiments of the present invention, there may be provided an apparatus and method for transmitting and receiving data using a relay device in a centralized Media Access Control (MAC) based wireless communication system that may transmit and receive data via a relay path using a relay device, even when a direct path between devices is blocked, or when a channel status is deteriorated.

Also, according to embodiments of the present invention, when determining a channel status with respect to relay paths, it is possible to more accurately determine the channel status by considering both a relay path between a device and a relay device, and a relay path between the relay device and a corresponding device. Unlike that data is transmitted via a communication path, selected when the device transmits the data, at a starting point in time of a relay CTA, data may be transmitted via a selected another communication path after a data sensing time is elapsed from the starting point in time of the relay CTA. Therefore, transmission and reception of the data may not be limited due to a time used when the corresponding device switches the communication path whereby the data may be smoothly transmitted and be received.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, an apparatus and method for transmitting and receiving data using a relay device in a centralized Media Access Control (MAC) based wireless communication system according to an embodiment of the present invention will be described in detail with reference to the accompanying drawings.

A method of transmitting and receiving data using a relay system in a centralized MAC based wireless communication system according to an embodiment of the present invention may be applicable to an Institute of Electrical and Electronics Engineers (IEEE) 802.15.3 wireless MAC technology. Hereinafter, the IEEE 802.15.3 wireless MAC technology adopting embodiments of the present invention will be briefly described.

An IEEE 802.15 Task Group 3 (TG3) is progressing a standardization of a high rate wireless personal area network (WPAN). The wireless MAC technology is in a structure of synchronizing devices using a centralized control. An IEEE 802.15.3 WPAN generally includes ad hoc networks, called a piconet. A single piconet may include a single piconet coordinator and a plurality of devices. The piconet coordinator may provide timing information of the piconet, and manage a quality-of-service (QoS) requirement, a power save mode, and an access control. The IEEE 802.15.3 MAC technology is in a format of a superframe that may use both a Carrier Sense Multiple Access with Collision Avoidance (CSMA/CA) scheme and a Time Division Multiple Access (TDMA) scheme. The superframe may include a beacon, a Contention Access Period (CAP), and a Channel Time Allocation Period (CTAP). The beacon is generated by the piconet coordinator, and may include information associated with the piconet, such as a length of the superframe, a length of the CAP and the CTAP, a piconet identifier, and synchronization information. All the devices included in the piconet may need to synchronize their own local clock with a PNC reference clock included in the beacon. A CAP may perform a channel access using the CSMA/CA scheme in order to transmit asynchronous data or command, whereas a CTAP may be reserved in order to transmit QoS sensitive traffic data using the TDMA scheme. In the CTAP, a plurality of Channel Time Allocations (CTAs) and Management Channel Time Allocations (MCTAs) may be scheduled. The CTAs and the MCTAs may be used to transmit data and the command, respectively.

Like an IEEE 802.11 standard, the IEEE 802.15.3 MAC technology may use the CSMA/CA scheme in the CAP. Unlike this, the TDMA scheme may be used in the CTAP. The CTAP may be divided into a plurality of CTAs managed by the piconet coordinator. A single CTA may be represented by a starting point in time and a reserved transmission duration. For this duration, other devices may not compete for use of a channel time. The CTA may be allocated to both an isochronous flow and an asynchronous data packet by the piconet coordinator. The CTA is allocated periodically for each superframe, whereas the synchronous data transmission may request a time required to transmit a single superframe.

A channel time request may be performed in the CAP by a device having data that the device desires to transmit in the CTAP. A request time may include not only a data transmission time but also a Short Inter-Frame Space (SIFS) transmission time and an acknowledgement (ACK) transmission time. Based on the request time, the piconet coordinator may transmit an ACK with respect to data successfully transmitted from the device. The piconet coordinator receiving the request may evaluate a current channel use status and pending requests, and may allocate a CTA to the device by informing a beacon of a subsequent superframe about a CTA allocation. The allocated CTA may be used by the owned device like a TDMA channel, and may not be used by another device.

Figure 1:
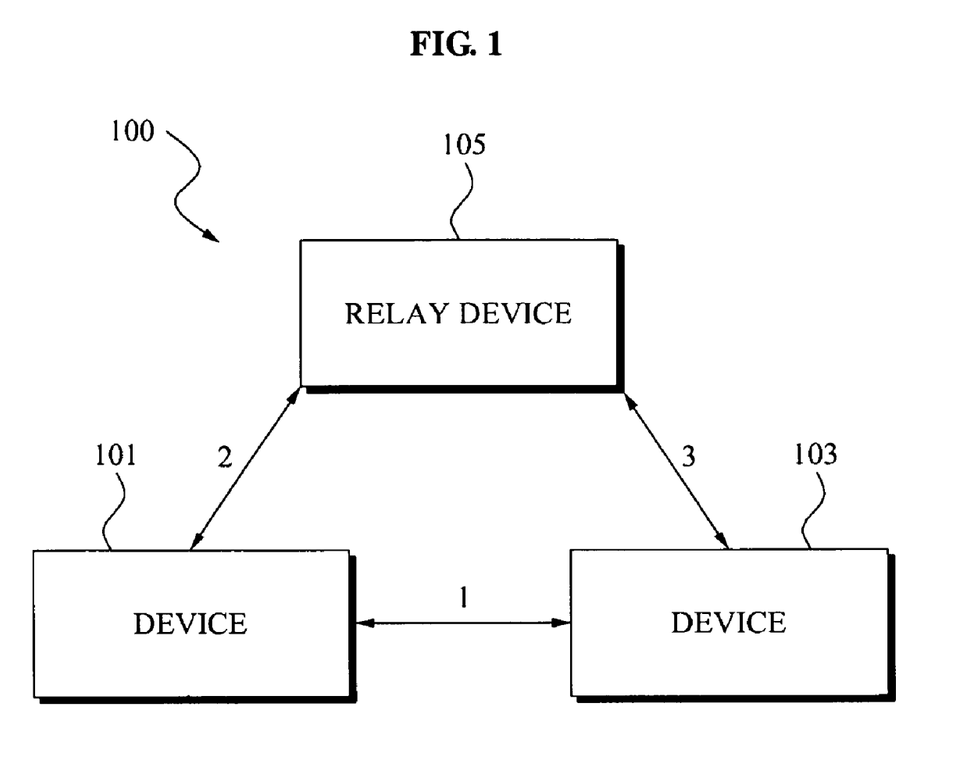
FIG. 1 is a block diagram illustrating a configuration of an apparatus for transmitting and receiving data using a relay device in a centralized Media Access Control (MAC) based wireless communication system according to an embodiment of the present invention.

FIG. 1 is a block diagram illustrating a configuration of an apparatus 100 for transmitting and receiving data using a relay device 105 in a centralized MAC based wireless communication system according to an embodiment of the present invention.

Referring to FIG. 1, the data transceiving apparatus 100 may include devices 101 and 103, and the relay device 105. Here, the centralized MAC based wireless communication system may use 60 GHz or a THz band. The devices 101 and 103 may be located in a Line of Sight (LOS). Here, it is assumed that setting of communication paths, beamforming, and CTA allocation among the devices 101 and 103, and the relay device 105 are completed.

In the case of the CTA allocation, for example, when the device 101 requests a piconet coordinator for a CTA, the piconet coordinator may approve the request to allocate the CTA, and may also inform the devices 101 and 103, and the relay device 105 about the allocated CTA. In this case, the devices 101 and 103 may transmit and receive data in the allocated CTA. Accordingly, the devices 101 and 103 may transmit and receive data using a direct path including a direct link 1 on the LOS, or using a relay path corresponding to a communication path using the relay device 105. The relay path includes two relay links 2 and 3. Here, the CTA that is approved to relay data between the devices 101 and 103 using the relay device 105 is defined as a relay CTA. Also, the device 101 may correspond to a source device, and the device 103 may correspond to a destination device.

Figure 2:
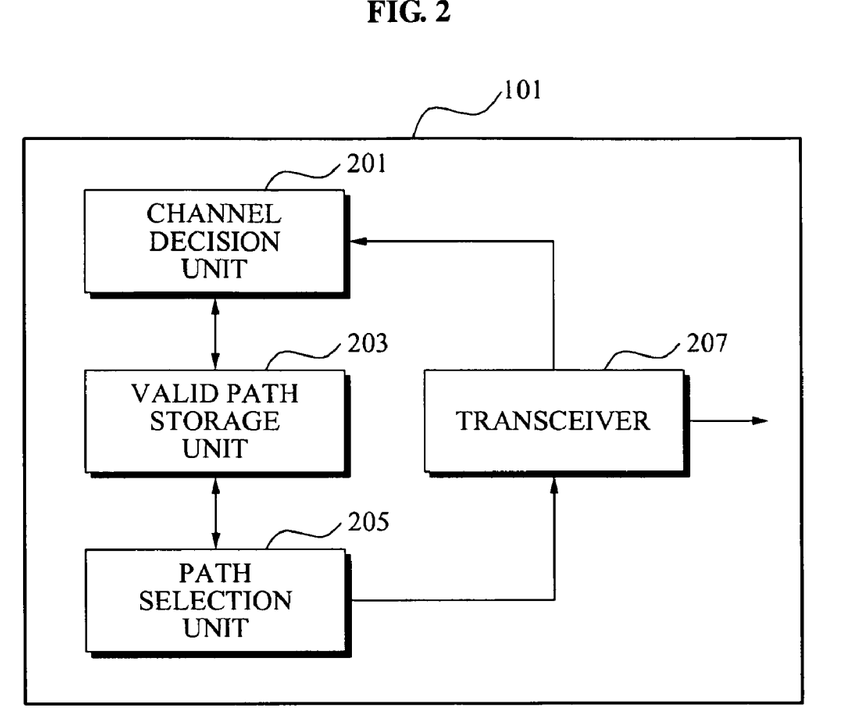
FIG. 2 is a block diagram illustrating a configuration of a device of FIG. 1.

FIG. 2 is a block diagram illustrating a configuration of the device 101 of FIG. 1.

Referring to FIGS. 1 and 2, the device 101 may include a channel decision unit 201, a valid path storage unit 203, a path selection unit 205, and a transceiver 207.

The channel decision unit 201 may determine a channel status with respect to the direct path including the direct link 1 between the devices 101 and 103, and the relay path that is the communication path using the relay device 105, including the two relay links 2 and 3. Specifically, the channel decision unit 201 may determine whether the communication paths including the direct path and the relay path are blocked, depending on whether response data with respect to transmitted data is received. Also, the channel decision unit 201 may estimate a channel status using channel status information that is fed back from the device 103 or the relay device 105 after the data is transmitted. Here, the fed back channel status information may include information associated with a signal to noise ratio (SNR), a received signal strength indication (RSSI), and the like, that are measured by the device 103.

When an ACK policy is a delayed ACK or a block ACK, the channel decision unit 201 may determine the channel status by comparing a retransmission request subframe ratio or a frame error rate (FER) with a predetermined threshold. Here, the retransmission request subframe ratio or the FER may indicate that subframe data is damaged.

Figure 3:
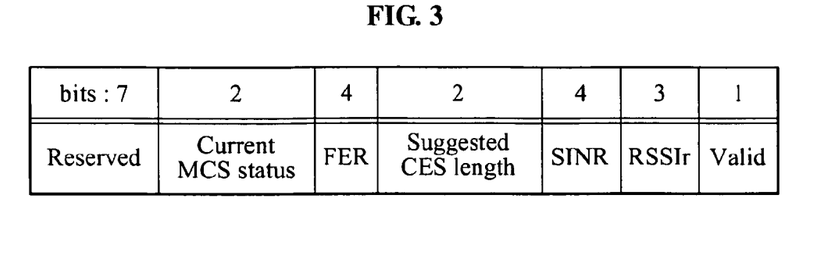
FIG. 3 is a diagram illustrating a format of a receiver status field according to an embodiment of the present invention.
Figure 4:
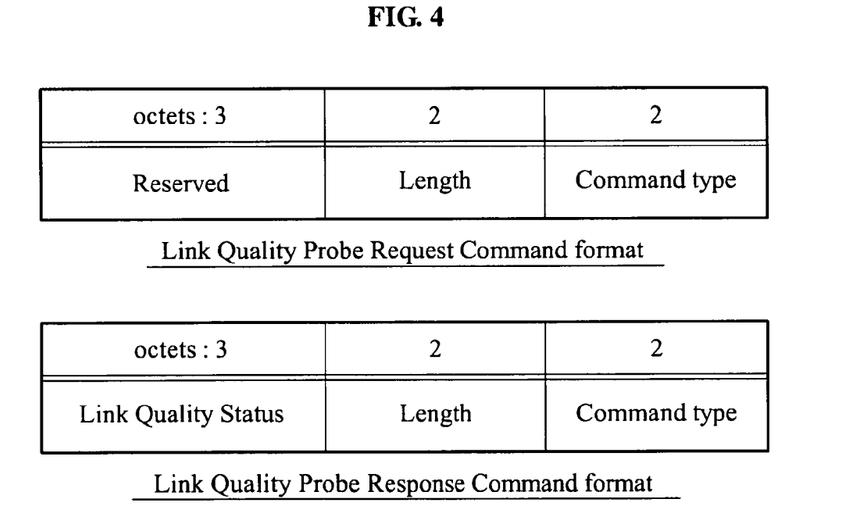
FIG. 4 is a diagram illustrating a format of a link quality probe request command and a link quality probe response command according to an embodiment of the present invention.

The channel decision unit 201 may determine the channel status with respect to the communication paths at predetermined intervals. In this instance, when an unselected non-use path is the direct path, the channel decision unit 201 may receive, from the device 103, response data including a receiver status field of FIG. 3, to determine the channel status. Also, when the unselected non-use path is the relay path, the relay path may include the two relay links 2 and 3. Therefore, Link Quality Indication (LQI) information associated with the quality of the relay links 2 and 3 may be required to determine the channel status of the relay path. The channel decision unit 201 may transmit a link quality probe request command of FIG. 4 to the relay device 105, and receive, from the relay device 105, a link quality probe response command including an LQI, and thereby determine the channel status of the relay path based on the LQI. In this instance, the LQI included in the link quality probe response command may be quality information of the relay path that is generated based on LQIs of the relay links 2 and 3. For example, the LQI may be a relatively poor LQI between the LQIs of the relay links 2 and 3. However, the present invention is not limited thereto. As another example, the LQI received from the relay device 105 may be a combination value or an average value of the two LQIs, and may also be a result value using a predetermined equation.

Also, the channel decision unit 201 may store, in the valid path storage unit 203, a communication path that is not blocked, and of which channel status information is greater than a predetermined value, that is, an available communication path. Next, the channel decision unit 201 may determine the channel status with respect to the communication paths at predetermined intervals, in order to verify whether communication paths are available.

The valid path storage unit 203 may store the available communication path. Also, as the channel decision unit 201 determines the channel status with respect to the communication paths at the predetermined intervals, the valid path storage unit 203 may update data regarding an available communication path that is changed according to a wireless environment.

The path selection unit 205 may receive the available communication path from the valid path storage unit 203, and may select at least one communication path from the communication paths based on the channel status. In this instance, the path selection unit 205 may select a communication path with a most excellent channel status. Also, the path selection unit 205 may priorly select the direct path between the devices 1 and 103. When the direct path is blocked, or when channel status information is less than a predetermined threshold value, the path selection unit 205 may select the relay path with the relay device 105. Even after a single communication path is selected, when a channel status of an unselected communication path is better than the channel status of the selected communication path, the path selection unit 205 may select the communication path with the better channel status.

The transceiver 207 may transmit and receive to and from the device 103 or the relay device 105 via the selected communication path. In this instance, data transmitted from the device 101 to the relay device 105 via the relay link 2 may be transferred to the device 103 via the relay link 3. Here, when an initial relay CTA starts, or when a communication path is not blocked in a previous relay CTA and thus is valid, the transceiver 207 may transmit data at the starting point in time of the relay CTA. Conversely, when the communication path is blocked in the previous relay CTA, for example, when the direct path is blocked and thus data is transmitted via the relay path, data may not be currently transmitted any more in the remaining time slot of the relay CTA. As a single path is used for a single relay CTA, the transceiver 207 may switch to a communication path that is selected after a data sensing time alpha is elapsed from a starting point in time of a subsequent relay CTA, and then transmit data.

Here, a current relay CTA denotes a relay CTA allocated so that data may be transmitted from a source device to a destination device via a piconet coordinator, and may be relayed via the relay device 105. Specifically, the current relay CTA denotes a relay CTA where these three devices may transmit data in an allocated time slot. The subsequent relay CTA denotes a relay CTA that is allocated next to a currently using relay CTA. The constant value alpha may be determined by reflecting a communication standard, so that a receiver may receive a data packet without a loss when the communication path is switched after the data sensing time. Therefore, when the device 103 is switched to the selected other communication path later than the device 101, it is possible to prevent a case where the device 103 may not receive the data. In this instance, when the device 103 does not receive data at a starting point in time of a CTA, the device 103 may recognize that the data is transmitted via the relay path and thereby may select the relay path and switch to the relay path. Specifically, when the device 103 does not receive data for the data sensing time, the device 103 may consider that the direct path is blocked, and may select and switch to the relay path to receive the data via the relay path. Here, a method of transmitting and receiving, by the transceiver 207, via the relay path has been described above, but the present invention is not limited thereto. The transceiver 207 may be applicable to a method of transmitting and receiving data via the direct path.

Figure 5:
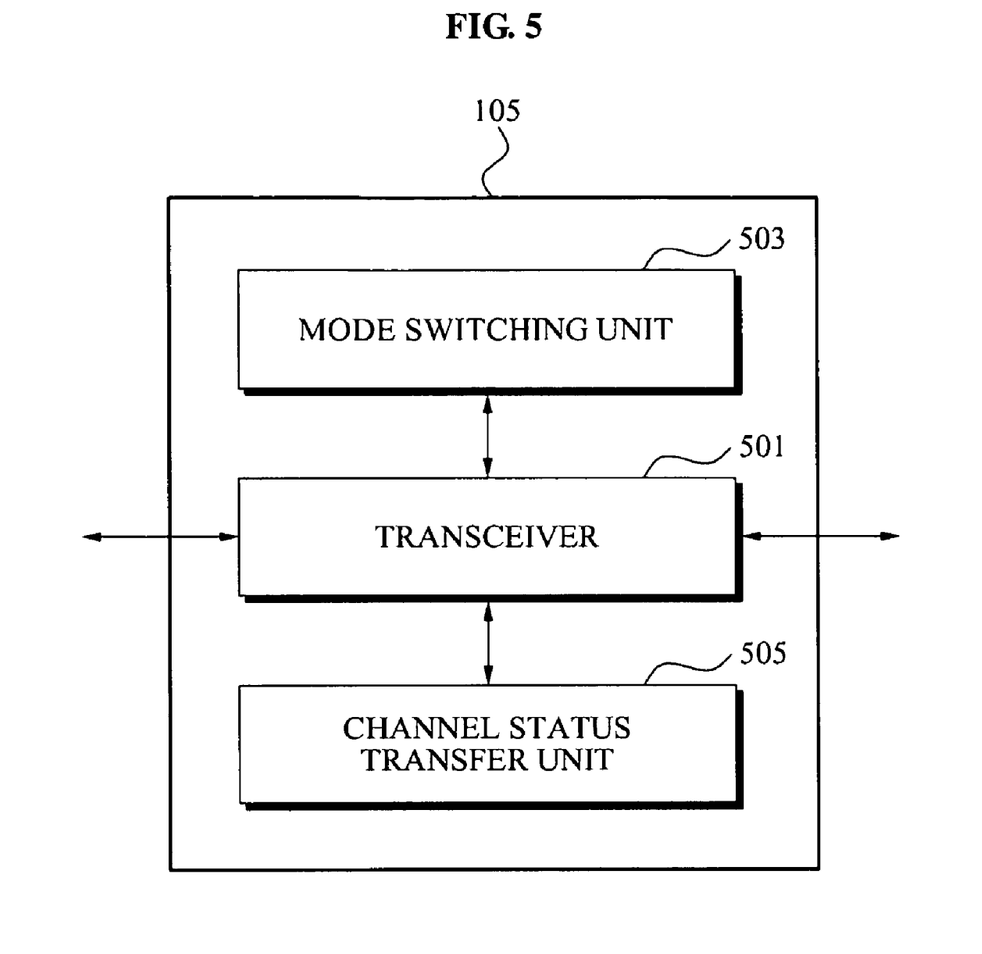
FIG. 5 is a block diagram illustrating a configuration of the relay device of FIG 1.

FIG. 5 is a block diagram illustrating a configuration of the relay device 105 of FIG. 1.

Referring to FIGS. 1 and 5, the relay device 105 denotes a device that may form a relay path with respect to the devices 1 and 3, for example, may be a piconet relay that may support a relay function. Here, the relay path may include the relay links 2 and 3 enabling a data communication between the devices 101 and 103, in addition to the direct path including the direct link 1 formed on the LOS between the devices 101 and 103.

The relay device 105 may operate according to an amplify-and-forward scheme that may amplify a signal, received via one of two radio frequency (RF) chains in a relay CTA, and transfer the amplified signal to another RF chain, and may also simultaneously perform decoding. Here, the relay CTA denotes a CTA that is approved to relay data via the relay device 105.

Figure 6:
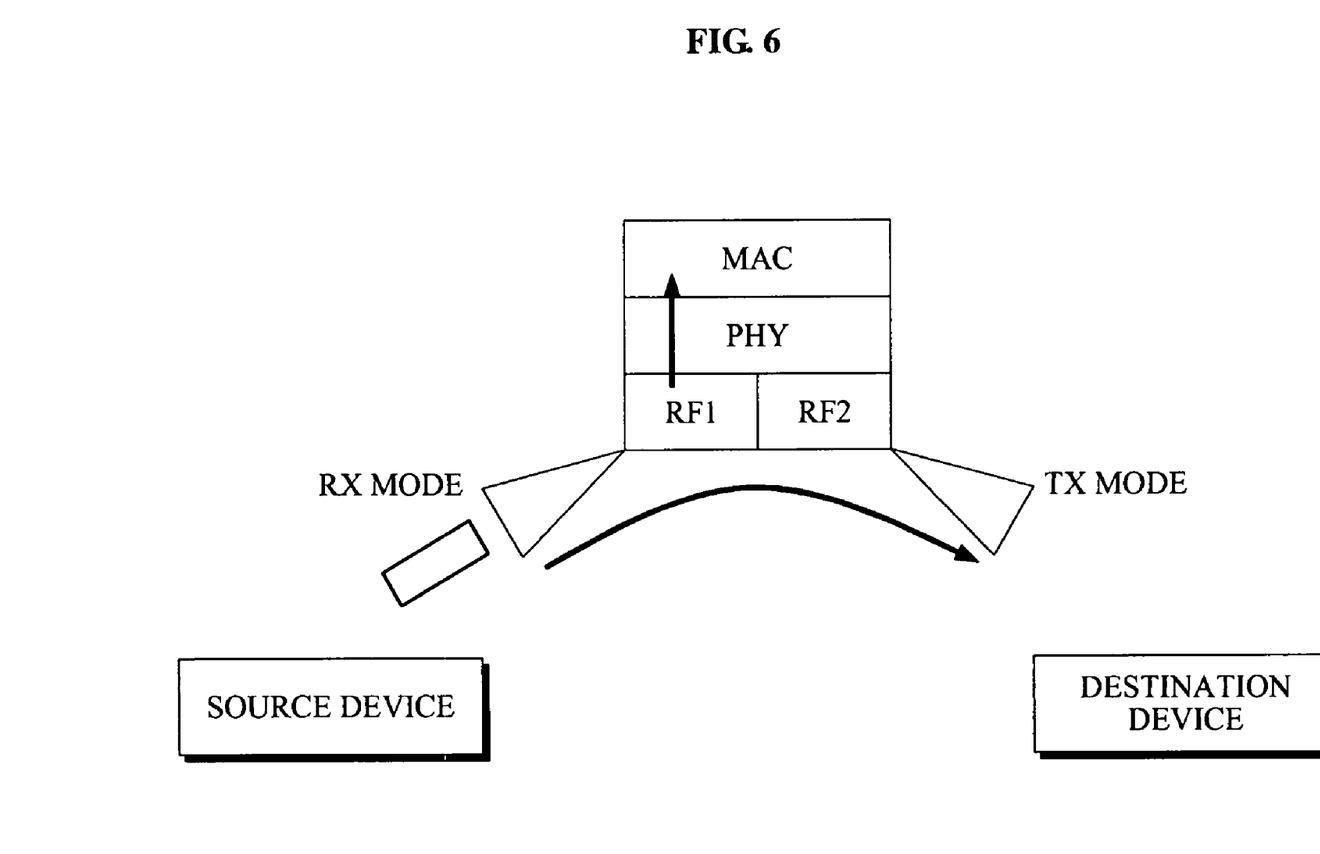
FIGS. 6 and 7 illustrate an example of processing data by a relay device according to an embodiment of the present invention.

As shown in FIG. 6, the relay device 105 may transfer, to RF2, a data frame that is received from a source device, so that the data frame may be transmitted to a destination device, and at the same time, may transfer the data frame to a physical layer PHY and a MAC of the relay device 105. In this instance, the relay device 105 may extract ACK mode information from a header of the data frame to determine whether to switch an RF mode. In a case where an ACK mode is determined as a block ACK mode with aggregation or an immediate ACK mode, the relay device 105 may receive a single packet and then immediately switch the RF mode. In a case where the ACK mode is determined as a delayed ACK mode, the relay device 105 may switch the RF mode only when a data frame with a set delayed ACK request field is received.

Figure 7:
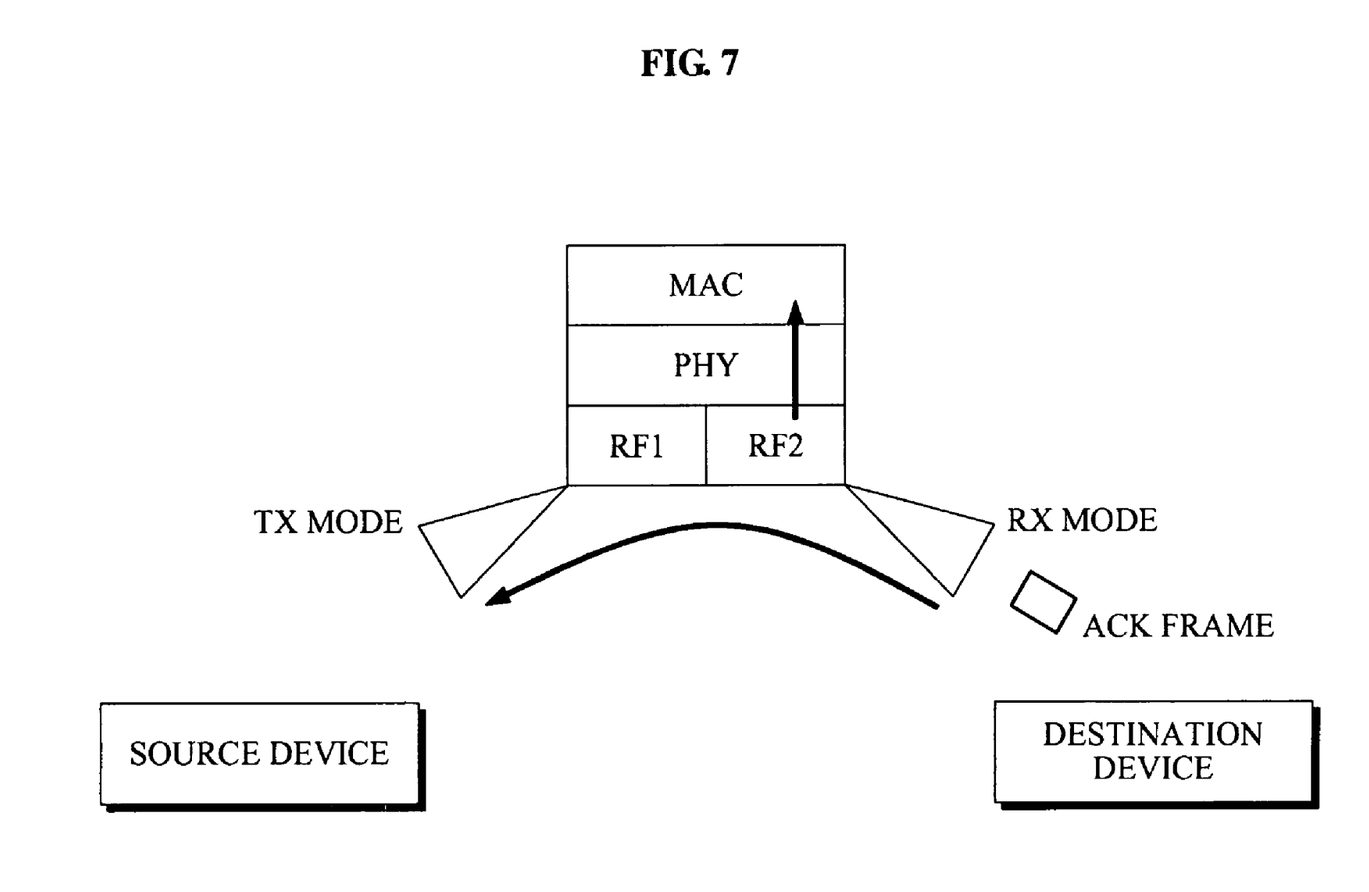

As shown in FIG. 7, the relay device 105 may switch a RF mode according to the ACK mode and then receive an ACK frame from a destination device to transmit the ACK frame to a source device according to an amplify-and-forward scheme. In this instance, since the relay device 105 receives the ACK frame from the header, the relay device 105 may immediately switch the RF mode. Specifically, when the relay device 105 does not support a relay function, two RF chains may operate in a reception mode. When the relay device 105 supports a relay function using the amplify-and-forward scheme, the relay device 105 may decode received data and may transmit the data using by switching one RF chain to the reception mode and switching another RF chain to a transmission mode according to a data transmission direction.

According to an embodiment of the present invention, the relay device 105 may include a transceiver 501, a mode switching unit 503, and a channel status transfer unit 505.

Referring to FIGS. 1 and 5, the transceiver 501 may receive data from the device 101 via an antenna corresponding to an RF chain of a reception mode, using the relay link 2, and may transmit the data to the device 103 via an antenna corresponding to an RF of a transmission mode, using the relay link 3. Also, the transceiver 501 may receive data from the device 103 via the antenna corresponding to the RF of the reception mode, using the relay link 3, and may transmit the data to the device 101 via the antenna corresponding to the RF of the transmission mode, using the relay link 2.

The mode switching unit 503 may partially decode the data and switch a mode of at least one of the RF chain of the reception mode and the RF chain of the transmission mode based on the partially decoded data. Specifically, when both of the RF chains are in the reception mode and in this instance, data is received from the device 101 via one RF chain, the mode switching unit 503 may switch a mode of another RF chain to the transmission mode in order to transfer the received data to the device 103. Also, when there is a need to change the data transmission direction, the mode switching unit 503 may switch the RF chain of the reception mode to the transmission mode, and switch the RF chain of the transmission mode to the reception mode. In order to receive subsequent data after current data transmission is completed, the mode switching unit 503 may switch the RF mode. Here, the data may be transferred to the device 103 and be partially decoded at the same time. Accordingly, before data to be transferred is completely received, the mode switching unit 503 may quickly perform mode switching using the partially decoded data.

Also, the mode switching unit 503 may be aware of an ACK policy using the partially decoded data. Prior to receiving the data, the mode switching unit 403 may predict the data transmission direction using the ACK policy, and thereby may switch the RF mode in advance. Through this, it is possible to reduce data loss when transmitting the data. Here, the ACK policy may be one of a block ACK, an immediate ACK, and a delayed ACK.

Figure 8:
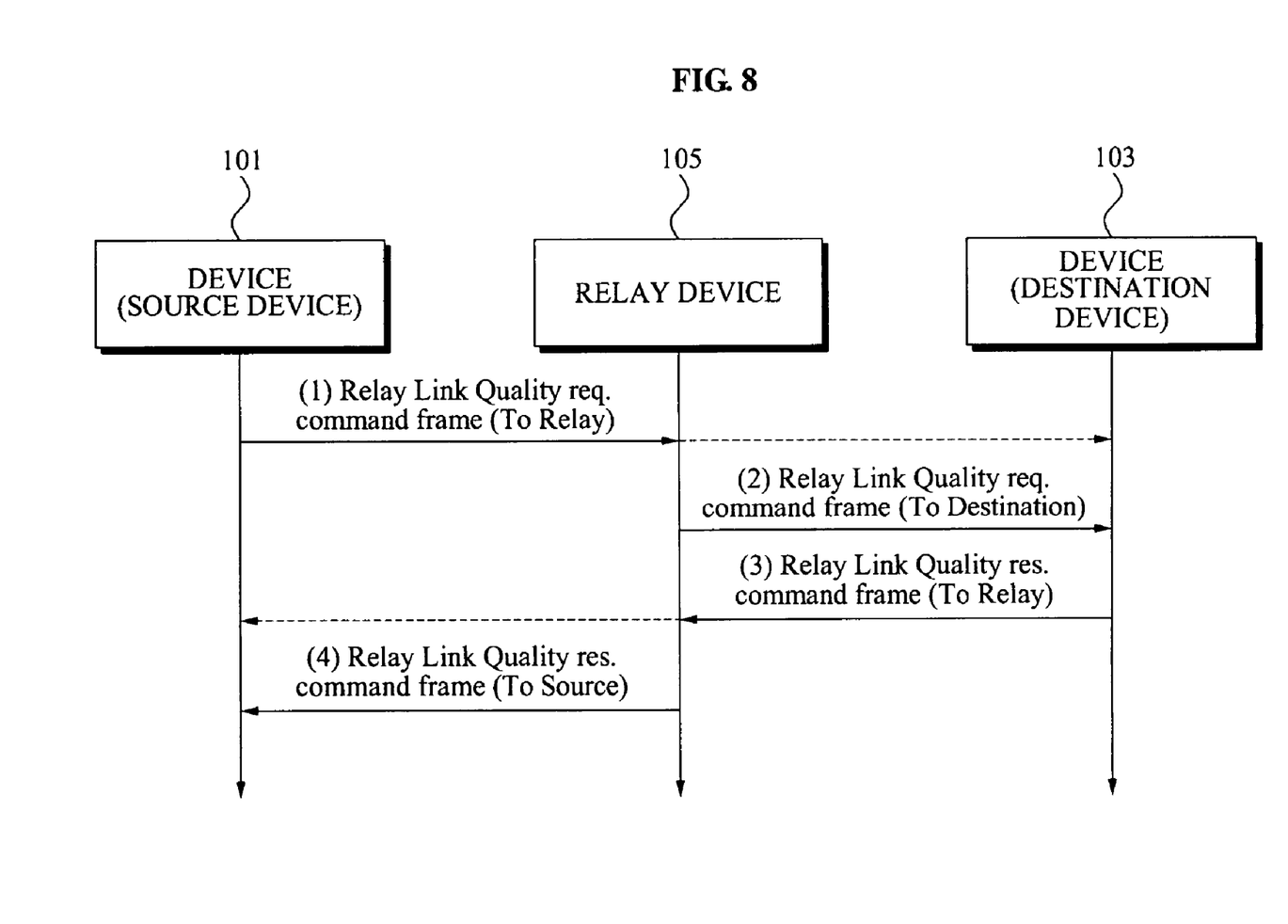
FIG. 8 is a diagram illustrating a process of performing link quality probing using a relay device according to an embodiment of the present invention.

As shown in FIG. 8, the channel status transfer unit 505 may transmit, to the device 101, quality information of the relay path that is generated based on LQIs of the relay links 2 and 3 and thereby provide the device 101 with a channel status of the relay path. In this instance, quality information of the relay path may include a relatively poor LQI between the LQIs of the relay links 2 and 3, but the present invention is not limited thereto.

Reasons why the channel status transfer unit 505 compares the LQIs of two relay links 2 and 3 to thereby transmit a relatively poor LQI may follow as. Specifically, when the device 101 transmits data via the relay path, the device 101 may need the channel status with respect to the two relay links 2 and 3, which is different from a case where the device 101 transmits data via the direct path including the direct link 1. However, as the relay device 105 operates according to an amplify-and-forward scheme, a method of determining the channel status of the direct link 1 may be applied to determine the channel status with respect to the relay links 2 and 3. In this case, since the device 101 may receive information where the channel status of the relay links 2 and 3 and a gain of the relay device 105 are aggregated, the device 101 may inaccurately determine the channel status.

Referring to FIGS. 5 and 8, when a link quality probe request command is received from the device 101, the channel status transfer unit 505 of the relay device 105 may transfer the link quality probe request command to the device 103, and may calculate an LQI of a relay link between the device 101 and the relay device 105. The channel status transfer unit 505 may receive, from the device 103, a link quality probe response command including an LQI of a relay link between the device 103 and the relay device 105. Next, the channel status transfer unit 505 may transfer, to the device 101, the link quality probe response command including quality information of the relay path, using the LQI of the relay link between the device 101 and the relay device 105, and the LQI of the relay link between the device 103 and the relay device 105, and thereby provide the channel status of the relay path. Here, the quality information of the relay path may be a relatively poor LQI among the LQIs of the two relay links, a combination value or an average thereof, or a result value using a predetermined equation.

Hereinafter, a blockage decision, a path switching, and a data transceiving according to an ACK policy will be described. Here, description will be made regarding a case where a path is being switched from a direct path to a relay path. It will be applicable to an opposite case.

Figure 9:
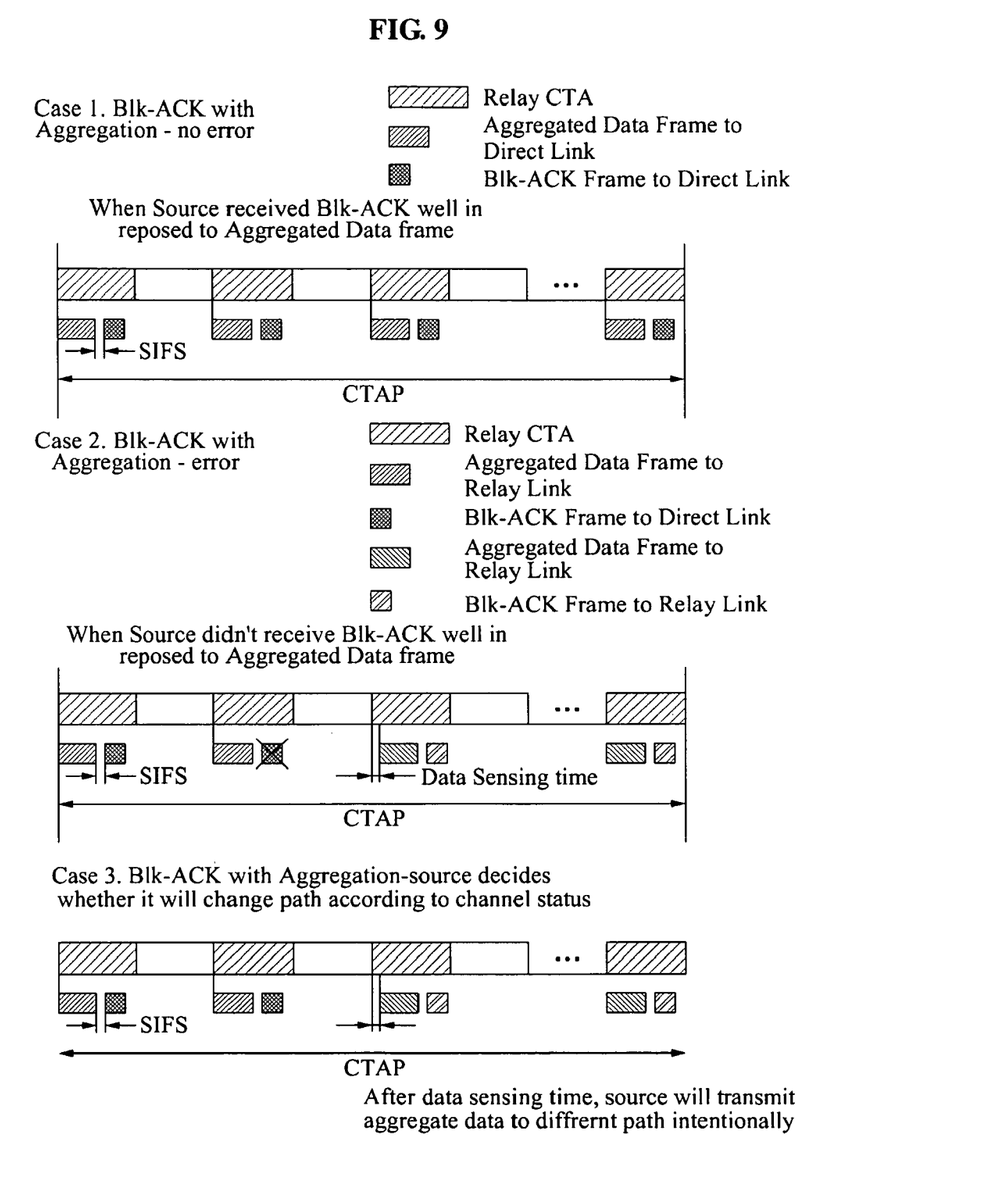
FIGS. 9 through 11 illustrate an example of transmitting and receiving data in a block acknowledgement (ACK), an immediate ACK, and a delayed ACK according to an embodiment of the present invention.

FIG. 9 illustrates an example of transmitting and receiving data in a block ACK according to an embodiment of the present invention.

Referring to FIG. 9, case 1 shows a data exchange in a normal block ACK. In this instance, a source device and a destination device may transmit and receive data at a starting point in time of a relay CTA via a direct path that is in a default status, without a need to switch a path.

Case 2 shows a data exchange when an ACK frame is not received. When the direct path is available, the source device may transmit data at the starting point in time of the relay CTA via the direct path. Unlike this, when the direct path is blocked, the source device may switch from the direct path to a relay path and then transmit data after a data sensing time is elapsed, in a subsequent relay CTA that is allocated next to a current relay CTA, instead of in the current relay CTA. Here, the source device may not transmit data any more in the remaining time slots of the current relay CTA where the direct path is blocked.

The destination device may be unaware of whether the source device receives an ACK frame after the ACK frame is transmitted. However, when the source device does not receive data at a starting point in time of the subsequent relay CTA via the direct path or for the data sensing time, the destination device may consider that the direct path is blocked, and switch to the relay path to receive data.

Case 3 shows a data exchange when the ACK frame is received but a channel status is poor. In this case, the source device may determine the channel status is poor, and thereby may transmit data via the relay path in the subsequent relay CTA instead of the current relay CTA. Like a case where the ACK frame is not received, when the direct path is blocked, the source device may switch from the direct path to the relay path and then transmit data after the data sensing time is elapsed in the subsequent relay CTA that is allocated next to a current relay CTA.

Like the case where the ACK frame is not received, when the data is not received for the data sensing time from the starting point in time of the subsequent relay CTA via the direct path, the destination device may also switch to the relay path to receive the data. When the destination device does not receive the data via the relay path, the ACK frame may not be transmitted. Accordingly, the source device and the destination device may switch to the direct path again in another subsequent relay CTA that is allocated next to the subsequent relay CTA where the data transmission is being performed, and then transmit data after the data sensing time. Here, when both the direct path and the relay path are blocked, the source device and the destination device may repeat only path switching. Accordingly, when the path switching is performed a predetermined number of times, a data exchange process may be terminated by transmitting a data transmission failure message to an upper layer.

Figure 10:
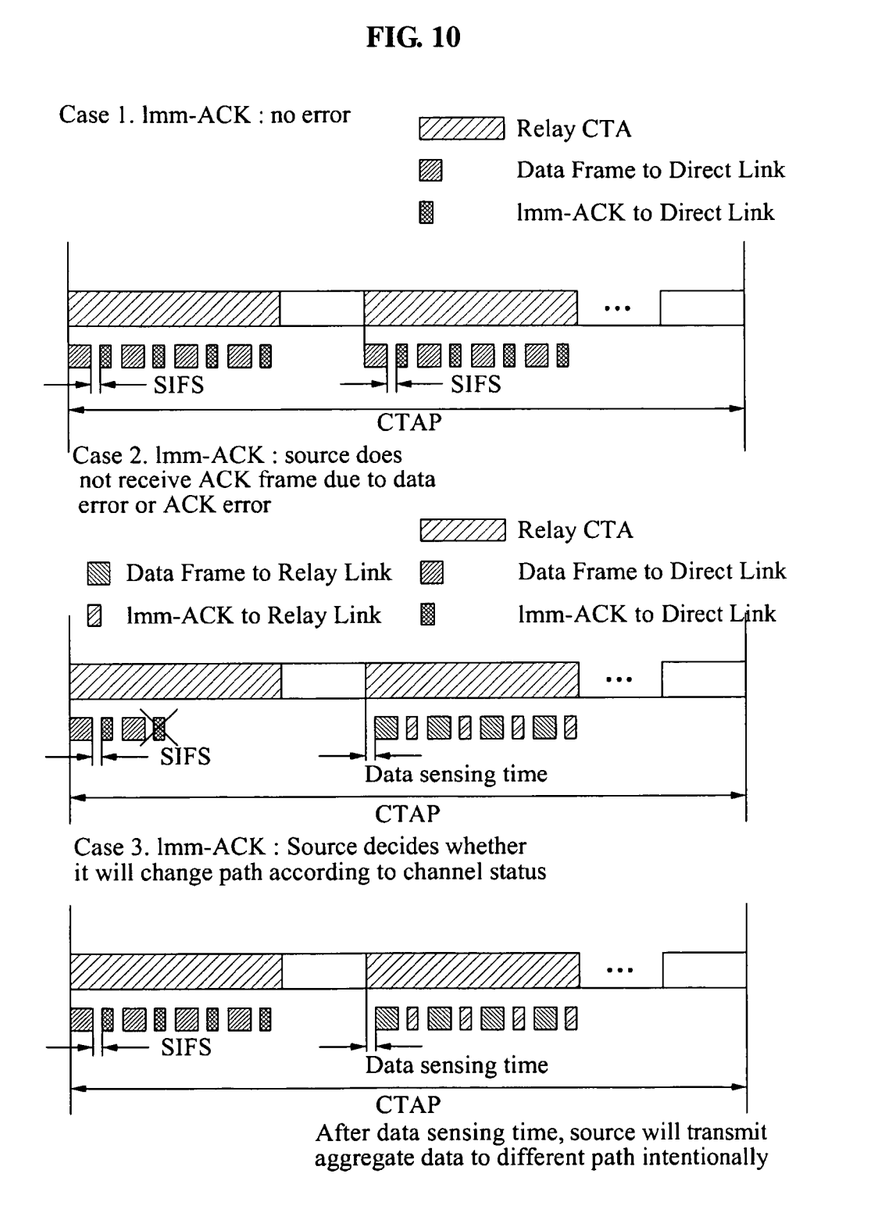

FIG. 10 illustrates an example of transmitting and receiving data in an immediate ACK according to an embodiment of the present invention.

FIG. 10 shows a case where a source device transmits a plurality of frames in a single relay CTA. A path switching or starting of a data transmission in a subsequent CTA may follow the same standard as the aforementioned block ACK of FIG. 9. Accordingly, referring to FIG. 10, it can be known that the source device may not use the remaining time slots in the path switching and then move to the subsequent relay CTA.

Figure 11:
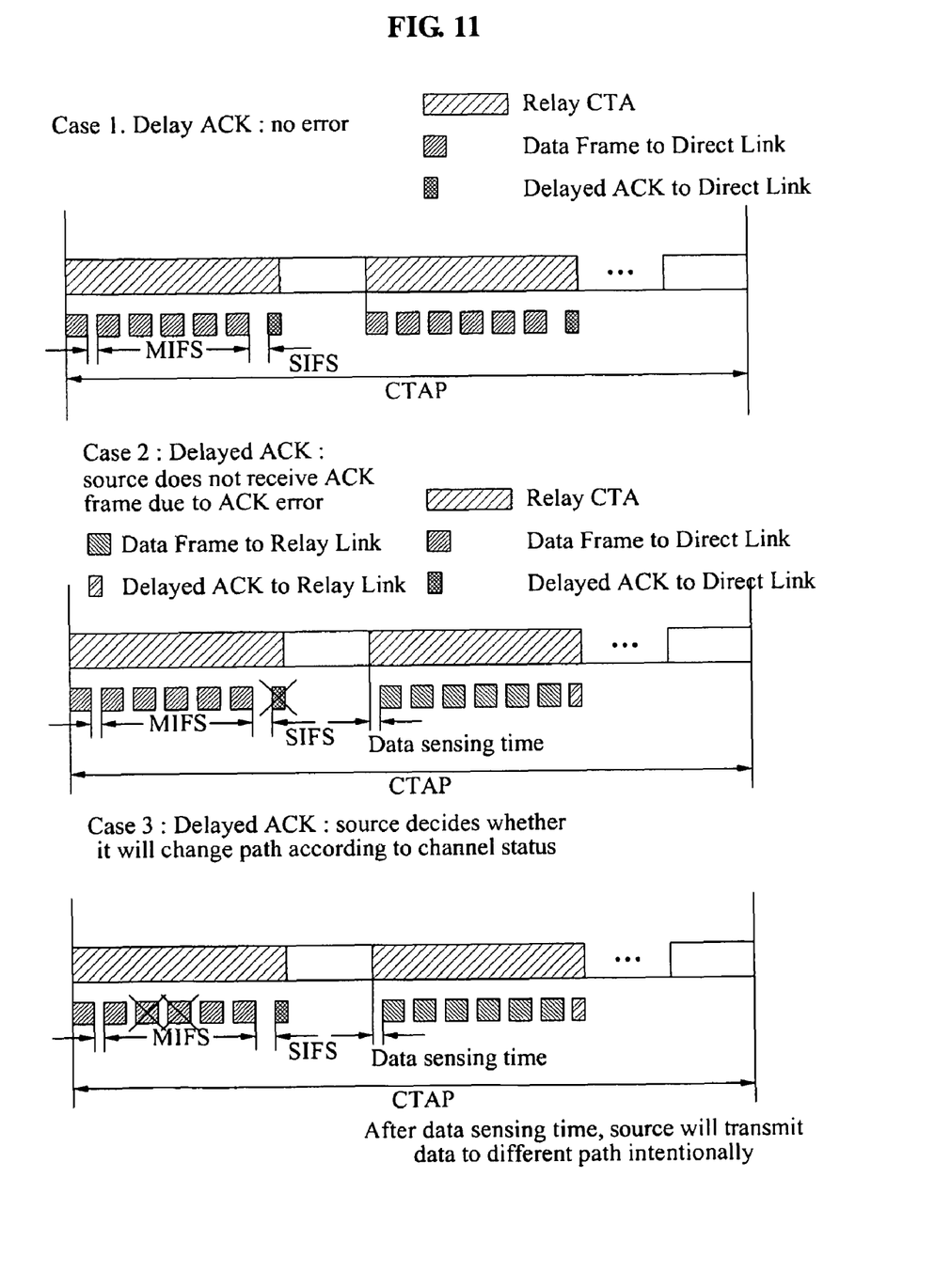

FIG. 11 illustrates an example of transmitting and receiving data in a delayed ACK according to an embodiment of the present invention.

Referring to FIG. 11, case 1 shows a data exchange in a normal delayed ACK, and case 2 shows a data exchange when an ACK frame is not received. Also, case 3 shows a data exchange when the ACK frame is received, but a channel status of a source end is poor. Here, although some data is not transmitted in the middle, the ACK frame is received. Therefore, only broken data may be retransmitted and then data may be transmitted without a need to switch a communication path. However, FIG. 11 shows a case where the source device determines a currently using communication path is blocked using a predetermined blockage decision scheme. Whether the communication path is blocked may be differently determined based on whether the ACK frame is received, a channel status, a variable such as a data rate, or a reference threshold corresponding thereto.

An apparatus for transmitting and receiving data in a centralized MAC based wireless communication system according to an embodiment of the present invention may use a relay device. Even when a direct path is blocked by a human being or an obstacle, the apparatus may use a relay path using the relay device and thereby may smoothly transfer data between a source device and a destination device.

Figure 12:
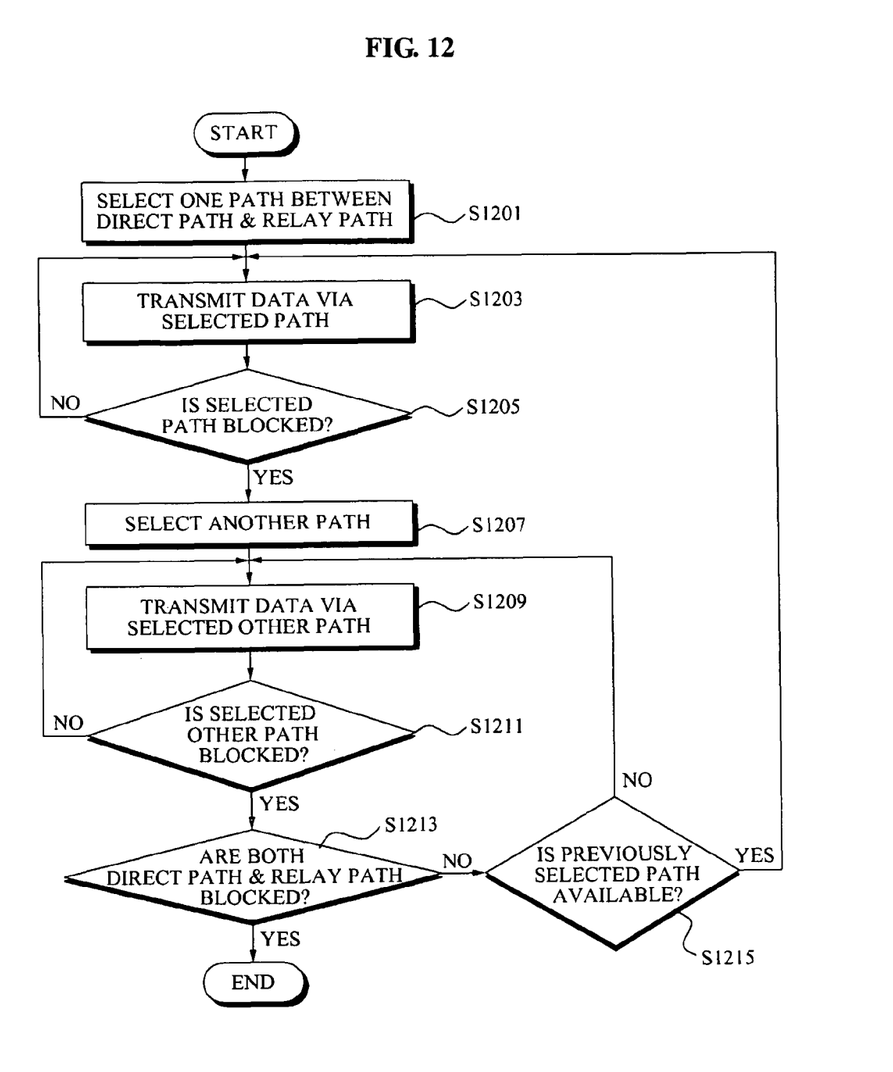
FIG. 12 is a flowchart illustrating a method of transmitting and receiving data using a relay device in a centralized MAC based wireless communication system according to an embodiment of the present invention.

FIG. 12 is a flowchart illustrating a method of transmitting and receiving data using a relay device in a centralized MAC based wireless communication system according to an embodiment of the present invention. Here, it is assumed that setting of communication paths, beamforming, and CTA allocation among a device, a corresponding device that transmits and receives data to and from the device, and the relay device, are completed. Also, a CTA that is approved to relay data between the device and the corresponding device via the relay device is defined as a relay CTA.

Referring to FIG. 12, the device may select one of communication paths in operation S1201.

Specifically, the device may select any one path between a direct path including a direct link and a relay path including two relay links. The device may priorly select the direct path, or may determine a channel status with respect to the direct path and the relay path and select a communication path with a relatively excellent channel status based on the channel status.

In this instance, the device may receive, from the corresponding device, response data including a receiver status field to determine the channel status of the direct path.

Also, the device may transmit a link quality probe request command to the relay device, and may receive, from the relay device, a link quality probe response command including an LQI, and thereby determine the channel status of the relay path based on the LQI. In this instance, the LQI included in the link quality probe response command may be a relatively poor LQI between two LQIs of relay paths. Also, the LQI may be a combination value of the two LQIs or an average value thereof, or may be a result value using a predetermined equation.

In operation S1203, the device may transmit data via the selected path.

The device may transmit data via the selected path until the selected path is blocked. The device may transmit data at a starting point in time of a relay CTA via the selected path.

When the selected path is blocked in operation S1205, the device may select another path in operation S1207.

When the selected path is blocked, or when channel status information is less than a predetermined threshold, the device may select the other path.

For example, when the previously selected path is the direct path and the direct path is blocked, the device may select the relay path. Conversely, when the previously selected path is the relay path and the relay path is blocked, the device may select the direct path.

In operation S1209, the device may transmit data via the reselected path.

The device may transmit the data via the selected other path, until the selected other path is blocked. For example, the device may transmit data via the relay path in a subsequent relay CTA, not in a current relay CTA where the direct path is blocked. In this instance, when data is not received at a starting point in time of the subsequent relay CTA or for a data sensing time, the corresponding device to receive data may switch to the selected other path to thereby receive the data.

Although the selected other path is not blocked, the device may periodically determine whether the previously selected path is available. Specifically, when the previously selected path is available and a channel status of the previous path is better than the channel status of the currently using selected other path, the device may transmit the data via the previous path. For example, although the selected relay path is not blocked, when the previously selected direct path is available and the channel status of the direct path is better than the channel status of the relay path, the device may transmit data via the direct path again.

When the selected other path is blocked in operation S1211, the device may verify whether all the communication paths are blocked in operation S1213.

Specifically, when both of the direct path and the relay path are not blocked in operation S1213, the device may verify an available communication path in operation S1215. When the previously selected path is available, the device may return to operation S1203 to transmit data via the previously selected path. Conversely, when the previously selected other path is available again, the device may return to operation S1209 to transmit data via the selected other path.

Conversely, when both of the direct path and the relay path are blocked in operation S1213, the device may terminate transmission of the data.

Hereinafter, a relaying method in an apparatus for transmitting and receiving data using a relay device in a centralized MAC based wireless communication system according to an embodiment of the present invention will be described.

Initially, the relay device may transfer, to a corresponding device, data received from a device.

Specifically, the relay device may receive data from the device via an antenna corresponding to an RF chain of a reception mode, and may transfer, via an antenna corresponding to an RF chain of a transmission mode, the data to the corresponding device that the device desires to communicate with. Here, the device may correspond to a source device that transmits data, and the corresponding device may correspond to a destination device that receives the data.

Next, the relay device may switch an RF mode.

Specifically, the relay device may partially decode the received data and switch a mode of at least one of the RF chain of the reception mode and the RF chain of the transmission mode based on the partially decoded data. Specifically, when there is a need to change a data transmission direction based on the decoded data, the relay device may switch the RF chain of the reception mode to the transmission mode, and switch the RF chain of the transmission mode to the reception mode. Accordingly, the relay device may receive data from the corresponding device and then transfer the received data to the device using the switched RF mode. In this instance, as the relay device may simultaneously transfer the data and partially decode the data, the data transmission direction may be predicted, which may result in reducing a data loss when transmitting the data.

Next, the relay device may provide the device with a channel status with respect to communication paths, using a link quality probe request command and a link quality response command.

Specifically, when the link quality probe request command is received from the device, the relay device may transfer the received link quality probe request command to the corresponding device, and calculate an LQI of a relay link between the device and the relay device. The relay device may receive, from the corresponding device, a link quality probe response command that includes an LQI of a relay link between the relay device and the corresponding device. Next, the relay device may transfer, to the device, the link quality probe response command including the LQI with respect to a communication path using the relay device, that is, the relay path, which is generated based on the LQI between the device and the relay device, and the LQI between the relay device and the corresponding device. Through this, the relay device may provide the channel status of the relay path. In this instance, the LQI included in the link quality probe response command may be a relatively poor LQI between two LQIs of the relay paths. Also, the LQI may be a combination value or an average thereof, or a result value using a predetermined equation.

According to embodiments of the present invention, a communication may be performed using multiple paths including a direct path and a relay path. Therefore, although a single path is blocked, it is possible to smoothly transmit and receive data via another path. In this instance, a number of relay paths may be a single, but the present invention is not limited thereto. Specifically, a plurality of relay paths may exist according to an environment of a wireless communication system. When determining a channel status with respect to the relay path, a channel status of a relay path between the device and the relay device, and a channel status of a relay path between the relay device and the corresponding device may be considered. Therefore, it is possible to more accurately determine the channel status. Data may be transmitted at a starting point in time of a relay CTA via a communication path that is selected when the device transmits data. Also, data may be transmitted, via a selected another communication path, after a data sensing time is elapsed from the starting point in time of the relay CTA. Accordingly, without any limit on transmitting and receiving data due to a time used when the corresponding device switches a communication path, it is possible to smoothly transmit and receive data.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of transmitting and receiving data at a device based on a centralized Media Access Control (MAC), the method comprising:

determining a channel status with respect to a communication path using a corresponding device and a communication path using a relay device;
selecting at least one communication path between the communication path using the corresponding device and the communication path using the relay device, based on the channel status; and
transmitting and receiving the data via the selected at least one communication path,
wherein the transmitting and the receiving comprises:
transmitting, via the selected at least one communication path, the data at a starting point in time of a relay Channel Time Allocation (CTA) that is allocated to the device; and
transmitting, via another communication path that is different from the selected at least one communication path, the data after a predetermined data sensing time is elapsed from a starting point in time of a subsequent relay CTA that is allocated to the device, when the other communication path different is selected.

2. The method of claim 1, wherein the determining comprises:
transmitting a link quality probe request command to the relay device;
receiving, from the relay device, a link quality probe response command including a link quality indication (LQI) of the communication path using the relay device, which is generated based on an LQI of a communication link with the relay device and an LQI of a communication link between the relay device and the corresponding device; and
determining the channel status of the communication path using the relay device, based on the LQI of the communication path using the relay device.

3. The method of claim 1, further comprising:
selecting another communication path when the selected at least one communication path is blocked, or when channel status information is less than a predetermined threshold; and
transmitting and receiving the data via the selected other communication path.

4. The method of claim 1, further comprising:
determining the channel status with respect to the communication path using the corresponding device and the communication path using the relay device at predetermined intervals; and
selecting a communication path responsive to channel status from among the communication path using the corresponding device and the communication path using the relay device.

5. The method of claim 1, further comprising:
selecting the other communication path, when the corresponding device does not receive the data from the device via the selected at least one communication path the data sensing time of the subsequent relay CTA; and
receiving, by the corresponding device, the data in the subsequent relay CTA via the selected other communication path.

6. A method of transmitting and receiving data at a relay device based on a centralized Media Access Control (MAC), the method comprising:
receiving data from a device via an antenna corresponding to a radio frequency (RF) chain of a reception mode to transfer, via an antenna corresponding to an RF chain of a transmission mode, the data to a corresponding device that desires to communicate with the device; and
partially decoding the data to switch a mode of at least one of the RF chain of the reception mode and the RF chain of the transmission mode based on the partially decoded data, wherein the data is transmitted to the corresponding device and is partially decoded at the same time.

7. The method of claim 6, further comprising:
transferring a link quality probe request command to the corresponding device, when the link quality probe request command is received from the device;
receiving, from the corresponding device, a link quality probe response command including an link quality indication (LQI) of a communication link between the relay device and the corresponding device; and
transferring, to the device, a link quality probe response command including an LQI of the communication path using the relay device, which is generated based on the LQI of the communication link between the relay device and the corresponding device and an LQI of a communication link between the device and the relay device.

8. A method of transmitting and receiving data at a relay device based on a centralized Media Access Control (MAC), the method comprising:
receiving data from a device via an antenna corresponding to a radio frequency (RF) of a reception mode to transfer, via an antenna corresponding to an RF of a transmission mode, the data to a corresponding device that desires to communicate with the device; and
partially decoding the data to switch a mode of at least one of the RF of the reception mode and the RF of the transmission mode based on the partially decoded data, wherein the data is transmitted to the corresponding device and is partially decoded at the same time.

9. The method of claim 8, further comprising:
transferring a link quality probe request command to the corresponding device, when the link quality probe request command is received from the device;
receiving, from the corresponding device, a link quality probe response command including an link quality indication (LQI) of a communication link between the relay device and the corresponding device; and
transferring, to the device, a link quality probe response command including an LQI of the communication path using the relay device, which is generated based on the LQI of the communication link between the relay device and the corresponding device and an LQI of a communication link between the device and the relay device.

* * * * *